Figure 1:
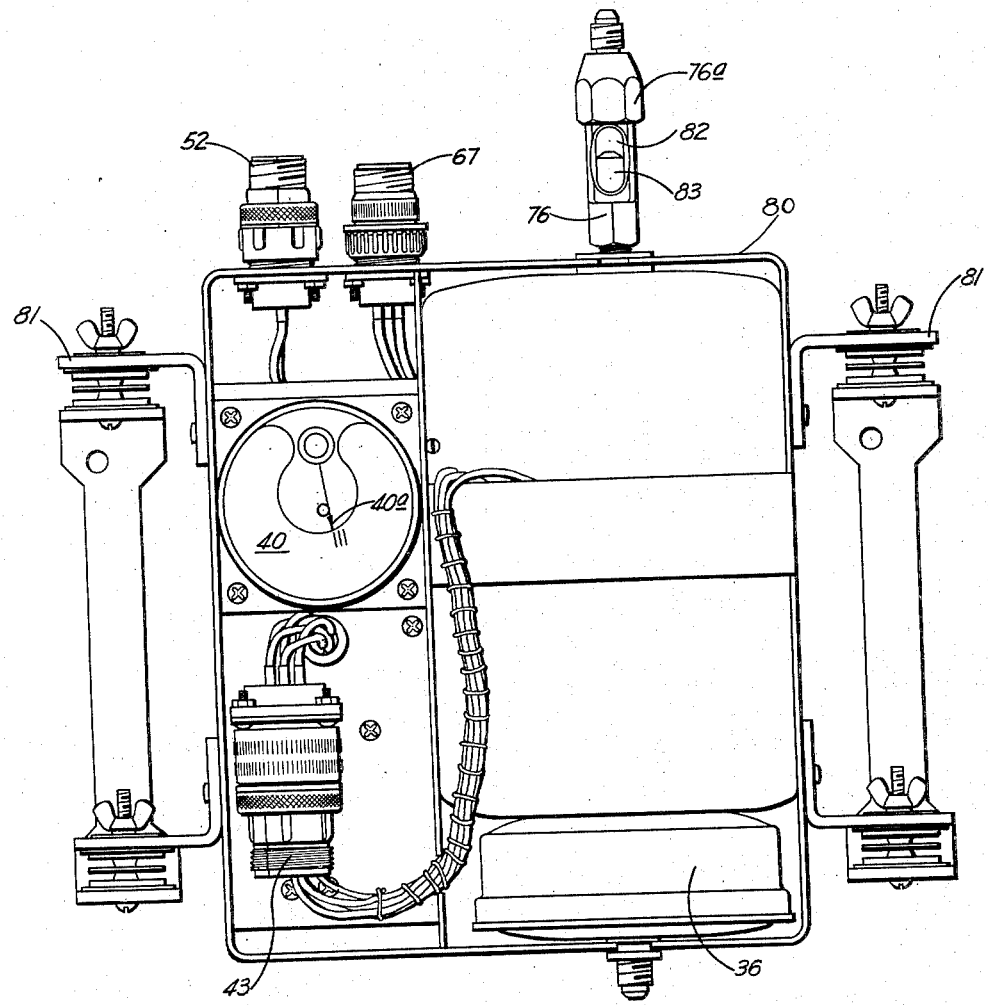

Nov. 28, 1950 W. P. YANT ET AL 2,531,592
METHOD AND APPARATUS FOR GAS ANALYSIS
Filed March 13, 1945 5 Sheets-Sheet 1

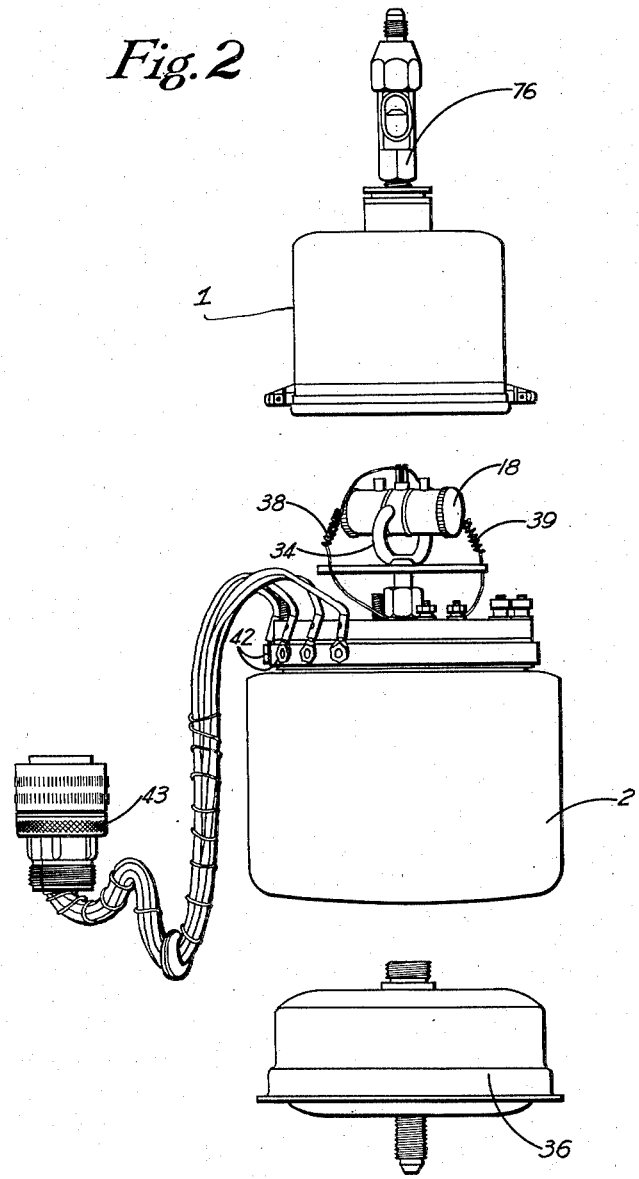

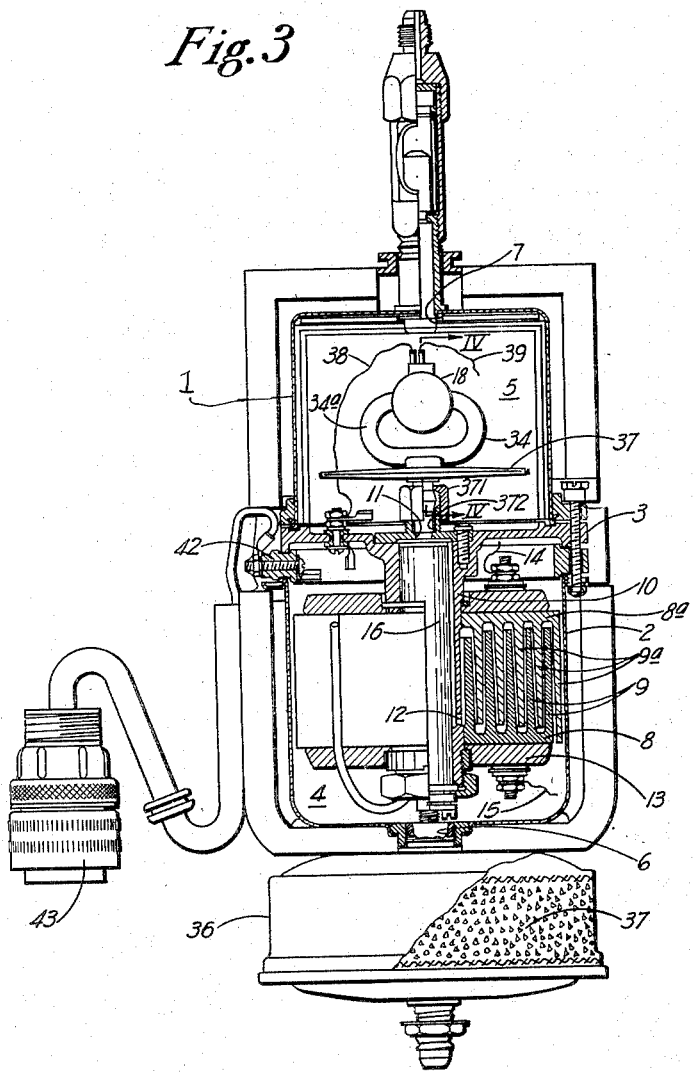

Nov. 28, 1950     W. P. YANT ET AL     2,531,592
METHOD AND APPARATUS FOR GAS ANALYSIS
Filed March 13, 1945     5 Sheets-Sheet 4
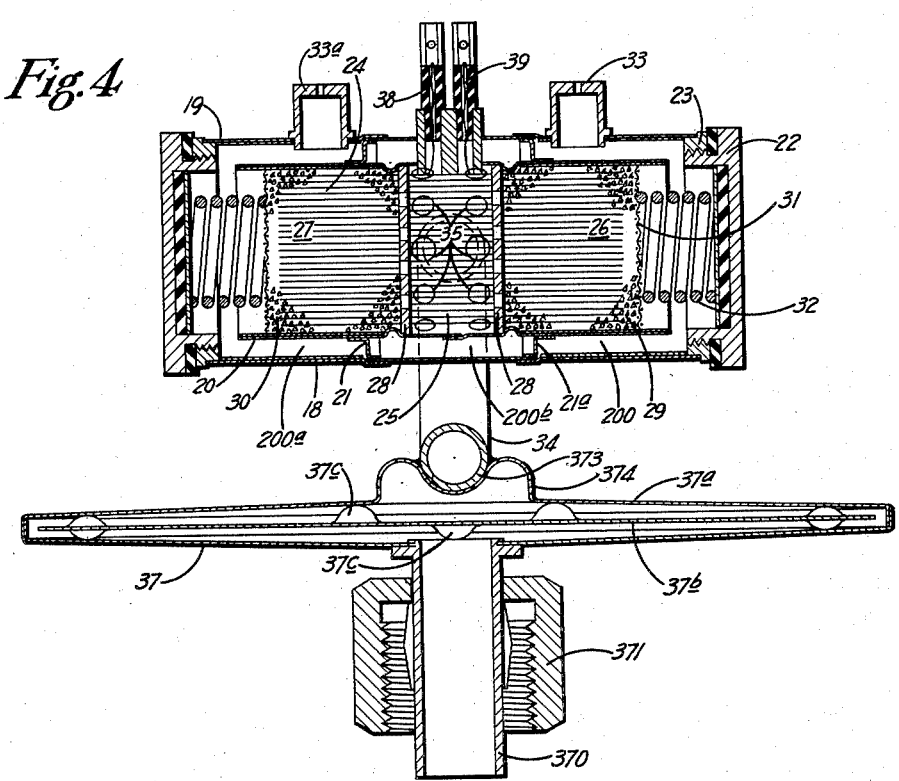
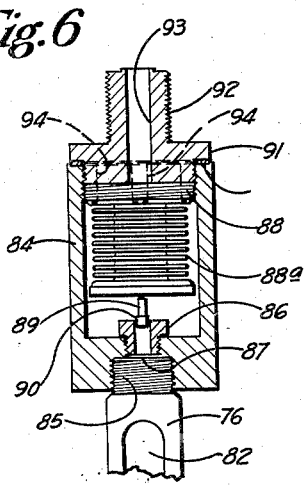
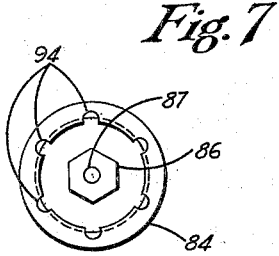
WITNESSES:
E. O. Johns
Sutton B. Flex
INVENTORS
William P. Yant
Harry N. Catakish
BY
Brown, Critchlow & Flex
ATTORNEYS

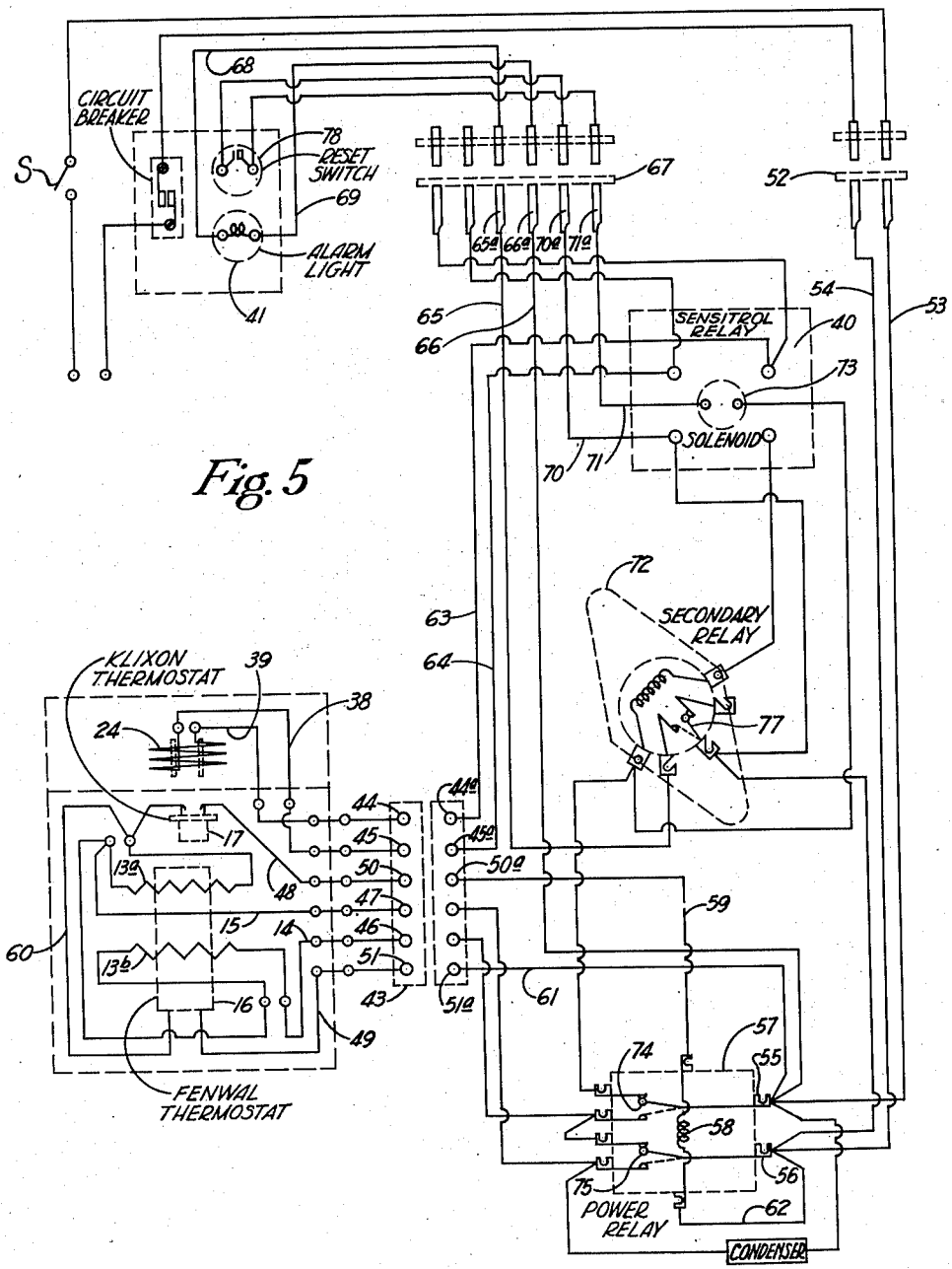

Patented Nov. 28, 1950

2,531,592

UNITED STATES PATENT OFFICE 2,531,592

METHOD AND APPARATUS FOR GAS ANALYSIS

William P. Yant, Murrysville, and Harry N. Cotabish, Pittsburgh, Pa., assignors to Mine Safety Appliances Company, Pittsburgh, Pa., a corporation of Pennsylvania Application March 13, 1945, Serial No. 582,468

13 Claims. (Cl. 23—232)

This invention relates to the analysis of air and other gaseous atmospheres to determine the presence and amount, either or both, of a combustible constituent, or combustible constituents, by catalytic oxidation thereof.

Although the invention is applicable generally to the determination of combustible constituents in gaseous atmospheres, it is applicable particularly to determining the concentration of carbon monoxide in air, for which reason it will be described with particular reference thereto by way of illustration, but not of limitation.

Carbon monoxide is recognized as being a major domestic and industrial hazard. Its dangerous character arises not only from the widespread possibility of exposure to it, but also from the facts that it is colorless and odorless, and extremely small concentrations are capable of causing permanent injury to health, and even death upon sufficiently prolonged exposure. The danger of carbon monoxide poisoning is important in aviation also, due to the possibility of seepage of exhaust gases into cabins, cockpits, or other enclosed spaces of aircraft. It is now recognized that this gas becomes an increasingly serious menace in high altitude flying, so much so that for military aviation it is specified that the maximum concentration permissible is from 0.005 to 0.007 per cent.

Prior to this invention no means has been available for accurately, quickly, reliably, and automatically, determining such amounts of carbon monoxide in air and which at the same time is compact, sturdy, light, and operable without attention over long periods of time, all of which are mandatory features for the detection and determination of carbon monoxide in aircraft. Also, apparatus used under such conditions must maintain its sensitivity and reliability under rapidly changing conditions of moisture content in the air being tested because very large changes in humidity are commonly encountered very suddenly due, for example, to rapid changes in altitude and to such factors as flying into cloud formations. This is an important factor because the catalysts used for oxidizing constituents of this type are highly sensitive to water vapor, and the means previously applied to minimize the effect of moisture in an atmosphere being tested are not adequate for sudden or large changes in the humidity of the atmosphere being tested.

A primary object of the invention is to provide a method for quickly, reliably and automatically determining combustible constituents in gaseous atmospheres, especially carbon monoxide in air, and which is applicable to the accurate determination of extremely small amounts of such constituents.

A special object is to provide such a method which is substantially independent of the water vapor content of the atmosphere being tested.

Another object is to provide a compact, sturdy and light apparatus for practicing the method provided by the invention, which is operable for relatively long periods of time without attention, and which signals the existence of a predetermined concentration of a combustible constituent in a gaseous atmosphere, particularly carbon monoxide in air.

Other objects are to overcome the objections to and difficulties encountered with prior methods and apparatus for determining combustible constituents in air by catalytic oxidation.

A still further object is to provide a novel form of cell for apparatus of the type referred to hereinabove.

Other objects will appear from the following description.

The invention will be described with reference to the accompanying drawings in which Fig. 1 is a vertical elevation of an instrument in accordance with the invention, the cover being removed; Fig. 2, a perspective exploded view of the heater and cell housing shown at the right-hand side of Fig. 1; Fig. 3 a vertical elevation, partly in section, through the assembled elements of Fig. 2; Fig. 4, a vertical sectional view on an enlarged scale through the cell and heat exchanger, taken on line IV—IV Fig. 3; Fig. 5 a wiring diagram of the instrument shown in Figs. 1 to 4; Fig. 6 a vertical sectional view through a modified outlet member; and Fig. 7 a plan view of Fig. 6 with the cap removed.

In accordance with the invention the atmosphere to be tested is heated to a temperature at which water vapor does not poison the catalyst, and it is then passed into contact with the junctions of a thermopile, at least part of one side of which is embedded in a body of oxidizing catalyst and at least part of the other side of which is embedded in a body of non-catalytic material, and the E. M. F. developed by the thermopile as a result of combustion of carbon monoxide, for example, is applied to means for measuring or indicating that occurrence, as has been standard practice. In the preferred embodiment such embedding materials include the junctions, i. e., the hot junctions are embedded in oxidizing catalyst, and the cold junctions in non-catalytic material. An important and distinguishing feature of the invention, however, is that all of the heated atmosphere is passed first into contact with the mid portion of the thermopile, from which it flows in streams of substantially equal volume over the hot and cold junctions. In this way we provide high sensitivity for extremely small concentrations of combustible constituents, as explained in detail hereinafter.

To compensate for water vapor in the gas being tested, we preferably embed the cold junctions of the cell in a material whose thermal response to water vapor is substantially the same as that of the material in which the hot junctions are embedded, i. e., the cold junction is embedded in a material whose heats of adsorption and of desorption are substantially the same as those of the oxidizing catalyst. Preferably also we compensate for large or sudden changes in the humidity of the atmosphere being tested by passing it first, i. e., before heating, through an adsorbent for water vapor which acts to adsorb water vapor upon an increase in the humidity of the gas passed through it but which releases adsorbed water vapor at a slow rate when the humidity of the atmosphere decreases.

Having reference now to the drawings, in the preferred embodiment the testing cell and heater element are preferably mounted within a casing. In the embodiment shown the casing comprises an upper cup member 1 and a lower cup member 2, suitably of sheet metal, between which there is disposed a partition member 3, and the assembly is connected and gasketed to provide gas tight joints. The partition member thus forms a lower chamber 4 and an upper chamber 5. The lower chamber is provided with an inlet opening 6 for gas to be tested, and the upper chamber is similarly provided with an outlet opening 7.

Mounted within the chamber 4 is a heater for the incoming air. Although this may take a variety of forms we now prefer a heater comprising a series of baffles of aluminum or other metal of high thermal conductivity, to provide a tortuous passage for the air. Most suitably this takes the form of a plate 8, Fig. 3, from which there project upwardly a series of spaced walls 9 in the form of concentric rings, and an upper plate 8a from which there project downwardly a series of similar walls 9a that extend into the annular spaces between the walls 9 and are spaced from them. Air entering chamber 4 thus enters the baffled passageway between the outermost wall 9a and the outermost wall 9, as shown at the righthand side of Fig. 3, and then flows upwardly and passes over the top of the outermost wall 9 then downwardly between it and the next adjacent inner wall 9a, and so on until it reaches the center of the heater, which surrounds a closed bottom tubular member 10 the upper end of which is associated with an opening 11 disposed centrally in partition member 3. This member acts both as a thermostat well and also as a conduit for the heated gas. From the heater the heated air enters the thermostat well through a series of spaced openings 12.

The baffles 9 and 9a are heated by an electric heating element 13 which is supplied with current from electrical connections 14 and 15. Mounted within the thermostat well 10 is a thermostat 16 associated with the circuit that supplies current to leads 14 and 15, for the purpose of opening or closing the circuit as need be to maintain the air which enters the conduit 10 at the proper temperature. For most purposes the heater should bring the gas to a temperature above the boiling point of water, to minimize poisoning of Hopcalite and similar catalysts, and for many purposes we prefer that the gas be heated to about 240° to 260° F.

Although a resistance heating element and a single thermostat, as described, may suffice for many purposes, we now prefer that the heating element 13 contains a pair of resistance elements 13a and 13b, Fig. 5, one of which is mounted below lower plate 8 and the other of which lies against upper plate 8a, and that these elements be in a circuit for connecting them in series or in parallel, as described more fully hereinafter. In such a case there is provided also a second thermostat 17 in the same circuit that acts to shift elements 13a and 13b from parallel to series connection. In this way it is possible to bring the heater up to operating temperature rapidly, by reason of the parallel connection, which is important when the instrument is to be put in operation at low temperatures such as may be encountered with high altitude aircraft. When the mass of metal in the heater has thus been brought to a temperature somewhat below its normal operating temperature, thermostat 17 shifts the resistances from parallel to series wiring, thereby reducing the current input. Thereafter and during use of the instrument the thermostat 16 controls the temperature of the heater, and consequently of the air passing through it. The thermostat 17 may be mounted within chamber 4, and we prefer to use the thermostat sold under the name "Klixon." Likewise, for the thermostat 16 we prefer to use that sold under the name "Fenwal."

The heated air rising through the annular space between the thermostat well 10 and the thermostat 16 passes through opening 11 to the testing cell, indicated generally by the numeral 18, Fig. 3. We prefer to use a novel form of cell which insures greater accuracy, sensitivity and reliability than have been attained with the cells used previously for this purpose. As shown in Fig. 4, the cell comprises outer and inner jacket members 19 and 20 mounted in spaced relation. Suitably these are tubular members that are held in fixed concentric, or coaxial, position by solid ring members 21 and 21a that serve not only as supporting elements but also as walls forming closed spaces between the jackets. The ends of outer jacket 19 are closed by threaded caps 22 that are screwed into end fittings 23 brazed or equivalently connected to the ends of the jacket.

Mounted within the inner jacket 20 is a thermopile 24 having its junctions at one end embedded in a body of a suitable oxidizing catalyst, and its junctions at the other end in a body of non-catalytic material, thus forming the hot and cold junctions, respectively, of the thermopile. A major feature of the cell provided and used in the practice of the invention is that all of the incoming heated air is caused to flow over the central portion of the thermopile before passing to the hot and cold junctions. To this end the inner jacket 20 is provided with a pair of partition members 28 spaced on each side of the mid section of the thermopile 24 to provide a central compartment 25 and end compartments 26 and 27. The partition members 28 are, of course, foraminous, or perforated, to permit flow of gas from compartment 25 into compartments 26 and 27, and suitably they take the form of discs of insulating material through which the wires of the thermopile extend so that they serve both as partitions and also as supports for the thermopile. The junctions at one end of the thermopile, say in end compartment 26 are embedded in a body of oxidizing catalyst 29, and those at the other end, in compartment 27, are embedded in a body 30 of inert, or non-catalytic, material. Compartments 26 and 27 are filled with their respective materials, while compartment 25 is open.

We now prefer to use the catalyst sold as "Hopcalite" as the oxidizing catalyst 29, because of its well known efficiency in oxidizing carbon monoxide and other combustible constituents of gases. However, a number of the other known oxidizing catalysts, e. g., on inert supports, may be used, examples being the platinum catalysts on alumina or activated alumina, viz., platinum black, with or without platinum oxide, carried by such supports. For reasons presently to be described we prefer to use as the non-catalytic material 30, a substance which has the same, or substantially the same, thermal response to water vapor as the catalyst 29, and we consider this to be an important feature of our invention.

In the embodiment shown the bodies 29 and 30 are held in place in their respective compartments by screens 31 biased by springs 32 which act between the screens and the caps 22. The screens thus serve to permit escape of air from the chambers 26 and 27 and at the same time provide for rapid and easy replacement of the catalytic and non-catalytic bodies when and if that is necessary.

A further novel feature of the cell is the provision of means for insuring equal flow through the catalytic and non-catalytic bodies. To this end the spaces 200 and 200a formed by the ring supports 21 and 21a and which surround, respectively, compartments 26 and 27, are provided with small matched orifices or flow controlling members, 33 and 33a which are so chosen that the flow resistance afforded by the orifice is large in comparison to the resistance of the catalytic or non-catalytic body. In this way any differences in flow resistance through the beds, such as might occur by variations in particle size, tightness of packing, or erosion in use, are small in comparison to the total resistance so that their influence on creating unbalance of the cell, with consequent variation in flow through the two beds, is minimized.

Heated air passes to the central compartment 25 of cell 18 through a conduit provided for that purpose. We now prefer to use a split conduit comprising branches 34 and 34a which open into diametrically opposed areas of outer jacket 19 in the space 200b between the ring supports 21 and 21a. The wall of the central compartment 25 is provided with a plurality of openings 35 through which the air or other gas being tested passes into compartment 25 from space 200b.

Our purpose in providing such a cell, in which the mid portion of the thermopile is bathed with all of the incoming heated air prior to its being passed to the active and inactive beds in which the hot and cold junctions are contained, is to reduce the flow of heat from the hot junctions toward the cold junctions and thus to provide a cell of improved sensitivity and accuracy, as compared with those available previously. That is, in other forms of split cells with which we are familiar half of the incoming, untreated gas is passed over half of the thermopile, and the rest of the gas is passed over the other half of the thermopile. As long as there is no combustible constituent present the hot and cold junctions will be at the same temperature in such a cell. However, upon the occurrence of combustion in the active zone the temperature of the hot junctions will, of course, increase, and there will thus be established a temperature differential between the hot and cold junctions so that heat will tend to flow from the former to the latter, obviously with impairment of the accuracy of the indicated result. However, in the form of cell shown in Fig. 4 the tendency for heat to flow back from the hot junctions is repressed because by passing all of the incoming heated air over the mid portion of the thermopile this tendency for flow of heat from the hot junctions to the cold junctions is substantially eliminated. Such a cell thus provides greater sensitivity and accuracy than those used heretofore.

We further provide a cell of improved accuracy by the aforementioned use of active and inactive materials of substantially the same thermal response to water vapor. Thus, a material such as Hopcalite, or an inert carrier for some other oxidizing catalyst, generally possesses a tendency to adsorb or desorb water vapor, depending upon the humidity of the gas passed through it. Such adsorption is accompanied by an evolution of heat, while the desorption of water vapor is endothermic. As long as there are no abrupt changes in humidity of the air, or if highly accurate measurement of extremely small concentrations of combustible constituent is not necessary, these factors are not important. The heat of adsorption or desorption of water vapor by the catalytic body becomes highly significant, however, where it is necessary to determine, for example, the maximum tolerable concentrations of carbon monoxide in aircraft atmospheres, and the difficulty is enhanced by the large changes in humidity that are encountered suddenly in normal aircraft operation. Thus, changes in altitude cause adsorption or desorption of water by the catalytic and non-catalytic materials in relation to the resultant changes in partial pressure of water vapor. We find, however, that this factor can be largely reduced, and even substantially eliminated, by using for the inactive bed 30 a material whose heats of adsorption and desorption for water vapor are essentially the same as those of the catalyst body 29. Among the various materials that might be used for that purpose we now prefer to use activated alumina. In this way the heat effects due to pick up and loss of moisture, as the case may be, are substantially the same in the two portions of the cell so that they neutralize each other.

We prefer also further to minimize the effect of humidity changes by providing the inlet 6 to chamber 4 with a canister 36 containing a body 37 of adsorbent material through which all of the ingoing air must pass. This material, of which activated carbon is an example, should adsorb moisture rapidly and desorb it slowly. Thus, the canister acts as a choke on the amount of water in the effluent air that passes to the heater and thence to the cell. Hence, if the instrument is suddenly exposed to an atmosphere of substantially increased humidity the activated charcoal rapidly reduces the content of water vapor and thus supplies air to the instrument the humidity of which is not so greatly different from that which it had been receiving as to affect seriously the indication of the instrument. Or, if the conditions are reversed, whereby the atmosphere suddenly changes from a condition of high to one of low humidity, the adsorbent in the canister releases so slowly that the effect upon the indication is negligible, i. e., so that the cell can adequately take care of the slow increase or decrease in moisture without impairment of its function. This adsorbent should also remove other substances which poison the catalyst or which would interfere with a given determination. Thus, in determining carbon monoxide in aircraft atmospheres this adsorbent should remove gasoline vapor which otherwise would be oxidized by the catalyst and give a false CO indication.

As a further means of improving the sensitivity and accuracy of the instrument we prefer also to provide a heat exchanger 37 between the cell 18 and the thermocouple well 19, which as seen in Figs. 3 and 4, comprises a circular shell 37a formed of thin sheet metal of high heat conductivity in which there is mounted a diaphragm 37b which is provided with upwardly and downwardly struck cup portions 37c that keep it spaced from but in metallic contact with the walls of shell 37a.

Heat exchanger 37 is provided centrally with a downwardly projecting nipple 370 for connection by a nut 371 to a threaded nipple 372 which is connected suitably about opening 11 in partition 3, thus providing for passage of heated gas from the heater to the heat exchanger. Gas passes from the heat exchanger through an opening 373 in a dome 374 into branch conduits 34 and 34a, and thence to cell 18. The purpose of this heat exchanger is as follows. Heat is transferred to cell 18 not only by the heated air supplied to it but also through the metallic path of the conduit between the cell and outlet 11. As the heater is turned on and off there will be changes in the temperature of both the air and the metallic conduits leading to the cell which are large in comparison to the heat effects produced by catalytic combustion within the cell, especially in the determination of exceedingly minute amounts of carbon monoxide or the like. Such changes would preclude the use of these instruments for determining combustible constituents of the order of a few one-thousands of a percent. By providing the heat exchanger 37, however, the temperature of the air passed through the conduits 34 and 34a and the temperature of the conduits are brought closer together with consequent repression of the temperature changes that would occur otherwise. Inasmuch as the cell may be heated also by radiation from the heater, we prefer that the heat exchanger 37 shall be of greater area, or diameter, than the cell 18, whereby any heat radiated from the heater is picked up by the heat excahnger which thus chokes its effect.

The use of two passageways to the cell, i. e., the branch conduits 34 and 34a, is more desirable than passing the heated gas to the cell through a single conduit because the flow of heat to the cell by metal conduction is distributed more uniformly over the cell. Maintenance of the catalytic and non-catalytic beds at proper temperature is assured also by the fact thatt he effluent gases from them circulate in the spaces 200 and 200a, respectively, thus assuring that the beds are kept at the proper operating temperature.

The terminals of the thermopile 24 are associated with electrical means for measuring, recording, or indicating, audibly or visibly, or combinations thereof, the occurrence of combustion of a combustible constituent. In the embodiment shown the E. M. F. generated by the thermopile upon combustion is applied to a sensitive relay 40, such as the relay sold as "Sensitrol" model 705 by the Weston Electrical Instrument Company, which is set to illuminate a signal lamp 41 when the concentration of carbon monoxide reaches a predetermined value. The leads from the thermopile, from the thermostat 16 and from the heater 13 are brought through the casing to exterior connector 42, Fig. 3, several of which are shown in Fig. 2, which are connected by leads to one part of a jack 43, indicated schematically in Fig. 5. Thus, the leads 38 and 39 from the terminals of thermocouple 24 are connected to points 44 and 45 of the jack, heater leads 14, 15. 48 and 49 are connected, respectively, to points 46, 47, 50 and 51 of the jack base 43.

In the circuit shown power is supplied from a suitable source to a jack 52 and through wires 53 and 54 to connector 55 and 56 of a power relay 57. One side of the coil 58 of this relay is connected by a lead 59 to prong 50a of jack 43 and thus through thermostat 17 to one side of the heater and also through a lead 60 through the thermostat 16 and thence through lead 49 to point 51 of jack base 43, from which the current passes through prong 51a of the jack and a lead 61 to relay connector 55. The other side of coil 58 is connected by a lead 62 to connector 56. Points 44 and 45 of jack base 43 connect the thermopile 24 through prongs 44a and 45a of the jack and leads 63 and 64 to the relay 40, which is in turn connected by leads 65 and 66, from a secondary relay 72, to points of 65a and 66a of the base of another jack 67 which points are connected to the signal lamp 41 by leads 68 and 69. Jack base 67 also is provided with points 70a and 71a connected by leads 70 and 71 to the secondary relay 72 and a solenoid 73 for resetting relay 40 and the secondary relay after the circuit has been closed to light the signal lamp 41.

In the use of this device, and assuming that the instrument is cold, a switch S supplying current to leads 53 and 54 is closed whereupon coil 58 is energized and the contacts 74 and 75 of the power relay 57 move to the position shown in broken lines in Fig. 5, connecting the heating elements 13a and 13b in parallel. When the heating elements reach the temperature for which thermostat 17 is set, the thermostat snaps open and contacts 74 and 75 snap upwardly to the solid line positions shown, thus changing the heating elements to series connection and reducing the rate of power input.

At the same time vacuum is applied by any suitable source through an adapter 76a screwed on a nipple 76 connected to outlet opening 7, as shown particularly in Fig. 3, to draw air into the instrument through canister 36. The air passes into lower chamber 4, through the heater, as described above, and into the thermostat well 10, from which it flows through heat exchanger 37 and by way of conduits 34 and 34a into cell 18 where, as described above, all of the air moves first over the mid portion of thermopile 24 from which streams of substantially equal volume pass through the active and inactive beds. Upon the occurrence of combustion in the active bed and hot junctions (in bed 29) became warmer than the cold junctions (in bed 30) with development of an E. M. F. that is applied to relay 40 and causes its pointer needle 40a to move a distance that is dependent upon the concentration of combustible constituent in the air. When the concentration of combustible constituents reaches the value for which the relay has been set, the pointer 40a of the relay contacts a magnetic post to close the secondary relay circuit and cause the alarm light 41 to be ignited, i. e., the contactor 77 of the secondary relay 72 is moved from the position shown to the broken line position.

Upon closing the reset switch 78, Fig. 5, the contact between the pointer 40a of relay 40 and its magnetic post is broken, the secondary relay 72 is opened by returning contactor 77 to its solid line position, and the alarm light 41 is turned off. If the concentration of combustible constituent has dropped, the light will stay unlit, if not it will be lighted again in a few seconds.

During the operation of the instrument thermostat 16 will open or close the heater element circuit as need be to maintain the heater at the proper temperature, as described above.

Various modifications are, of course, permissible without altering the essence of the invention. For example, the cell with the heat exchanger used in the preferred embodiment may be mounted in the lower compartment of the casing and the heater in the upper compartment, or the instrument may even be disposed in a horizontal direction. Similarly, the atmosphere to be tested may be passed through the instrument by means of a blower instead of by suction as described, and various other structural modifications embodying the principles disclosed are within the skill of those familiar with the art. Moreover, thermostatic control as described above may be dispensed with for some purposes although for most purposes it is preferred to secure better performance over widely varying conditions and to guard against overheating.

Fig. 1 illustrates the instrument carried in a case 80 provided with bracket members 81 for mounting it in an appropriate location in an airplane. Case 80 is, of course, provided with a cover, not shown, having a glazed aperture through which the relay 40 may be viewed. This figure represents instruments as actually constructed for use in aircraft for signaling the existence of between 0.005 and 0.007 per cent of carbon monoxide in the atmosphere within the aircraft. The scale of the relay 40 may, of course, be calibrated so that the needle will register amounts of carbon monoxide below that which actuates the signal light. These instruments are approximately 12½ inches high, 10½ inches wide and 4½ inches in depth, and they weigh above 8¼ pounds. They operate on 20 to 40 volts D. C., and at 24 volts they draw 5.75 amperes of current during the first 12 minutes of operation with the heating elements, of 70 watts capacity, in parallel, after which the amperage drops to a maximum of 1.75. The air is drawn through the instrument with a suction of 4 inches of mercury. Such electrical capacity and suction are readily available on modern aircraft. In the embodiment shown the nipple 76 is provided with a sight glass 82 for observing a float 83 that is mounted within the nipple and which is calibrated to rise when the vacuum applied to the instrument is two inches of mercury, or more.

Another modification is shown in Figs. 6 and 7. As shown, a cylindrical casing 84 is provided centrally of its base with a threaded bore 85 adapted to be screwed on nipple 76 in place of adapter 76a. The upper end of bore 85 is threaded to receive a nut 86 having a small diameter bore 87. The upper end of casing 84 is threaded interiorly to receive an aneroid member having its head 88 provided with complementary threads. From the lower end of the aneroid bellows 88a there extends downwardly a rod 89 at the end of which is a plug 90 mounted concentrically of opening 87 in nut 86. Plug 90 is of such size as to be adapted to close bore 87, and the bellows is positioned in the casing so that as it expands or contracts under variations of pressure, plug 90 will move toward or from bore 87 to decrease or increase the flow of gas through nipple 76.

A cap member 91 provided with a central, upstanding, threaded nipple 92 having a bore 93 is screwed into the top of casing 84, above the aneroid member, a gasket 94 providing an adequate seal. Adapter 76a may be screwed onto nipple 92, for connection to a source of vacuum, and gas entering casing 84 passes from it through a series of semi-circular channels 94 cut in the wall of the threaded portion at the top of the casing.

This aneroid valve is provided so that under conditions of varying ambient pressure of the air or other atmosphere being tested its response thereto will provide a relatively constant mass of air passing through the apparatus, and thus it makes the response of the instrument constant over a wide range of conditions of atmospheric pressure because as the ambient pressure increases or decreases the aneroid is actuated to increase or decrease the overall resistance of the instrument, and thus to provide flow that maintains constant, comparable conditions.

In this connection, it is known that where the temperature effect is measured by a thermopile, the E. M. F. developed increases with increase in rate of flow up to a maximum which is substantially the same for various concentrations of the gas being tested, and that the response is most rapid at the said maximum. If cells in accordance with this invention were to be operated at that maximum there would be no need for the aneroid device described. However, for aircraft work small cells are necessary, which necessitates high flow rates and operation at the maximum results in deterioration of the catalyst in a relatively short period of time. Hence, for aircraft purposes the alarm described is desirably designed to operate before the maximum is reached so that the cell is more sensitive to changes in the ambient atmospheric pressure, and for this reason the use of the aneroid control described is desirable where it is wished to have approximately linear response for changing altitudes.

According to the provisions of the patent statutes, we have explained the principle and mode of operation of our invention and have illustrated and described what we now consider to represent its best embodiment. However, we desire to have it understood that, within the scope of the appended claims, the invention may be practiced otherwise than as specifically illustrated and described.

We claim:
1. That method of determining a combustible constituent in a gaseous atmosphere by combustion with an oxidizing catalyst which comprises heating the atmosphere to a temperature at which water vapor does not poison the catalyst, passing the heated atmosphere into contact with the mid portion of a thermopile having at least a portion adjacent its hot junctions embedded in a body of oxidizing catalyst adapted to oxidize said constituent, and at least a portion adjacent the cold junction embedded in a body of catalytically inactive material, then distributing the heated atmosphere from said mid portion of the thermopile in amounts of substantially equal volume laterally into and through a substantial cross section of said bodies and over said junctions, and applying the E. M. F. of said thermopile due to oxidation of said constituent to indicate the occurrence of such oxidation.

2. That method of determining a combustible constituent in a gaseous atmosphere by combustion with an oxidizing catalyst which comprises heating the atmosphere to a temperature at which water vapor does not poison the catalyst, passing the heated atmosphere into contact with the mid portion of a thermopile having its junctions at one end embedded in a body of oxidizing catalyst adapted to oxidize said constituent, and having the junctions at the other end embedded in a body of catalytically inactive material whose thermal response to water vapor is substantially that of said catalyst body, then distributing the heated atmosphere from said mid portion of the thermopile in amounts of substantially equal volume laterally into and through a substantial cross section of said bodies, and applying the E. M. F. of said thermopile due to oxidation of said constituent to indicate the occurrence of such oxidation.

3. That method of determining carbon monoxide in air by combustion with an oxidizing catalyst which comprises passing the air through an adsorbent which adsorbs and desorbs water, then heating the air to a temperature at which water vapor does not poison the catalyst, passing the heated air into contact with the mid portion of a thermopile having its junctions at one end embedded in a body of oxidizing catalyst adapted to oxidize carbon monoxide, and having the junctions at the other end embedded in a body of catalytically inactive material whose thermal response to water vapor is substantially that of said catalyst body, then distributing the heated air from said mid portion of the thermopile in amounts of substantially equal volume laterally into and through a substantial cross section of said bodies, and applying the E. M. F. of said thermopile due to oxidation of said constituent carbon monoxide to signal the occurrence of such oxidation.

4. That method of determining a combustible constituent in a gaseous atmosphere by combustion with an oxidizing catalyst which comprises passing the atmosphere through an adsorbent which adsorbs and desorbs water, then heating the atmosphere to a temperature at which water vapor does not poison the catalyst, then passing the heated atmosphere into contact with the mid portion of a thermopile mounted in a container with its junctions at one end embedded in a body of oxidizing catalyst adapted to oxidize said constituent, and with the junctions at the other end embedded in a body of catalytically inactive material whose thermal response to water vapor is substantially that of said catalyst body, then distributing the heated atmosphere from said mid portion of the thermopile in amounts of substantially equal volume laterally into and through a substantial cross section of said bodies, applying the E. M. F. of said thermopile due to oxidation of said constituent to indicate the occurrence of such oxidation, and circulating said atmosphere from each of said bodies externally around that portion of said container in which the body is disposed.

5. Gas testing apparatus for determining a combustible constituent in a gas comprising a conduit for gas to be tested, an electric heater associated with said conduit, a thermostat for controlling the temperature of said heater, a testing cell comprising a closed housing member and a container mounted within and spaced from the walls of said housing member, foraminous partition means dividing said container into a central and two end compartments, the end compartments having outlets for gas passed through from said central compartment, a thermopile disposed in said container with the junctions at one end disposed in one of said two end compartments and the junctions at the other end disposed in the other of said two end compartments, a connection leading from said conduit to said central compartment, an outlet from said housing, and electrical means associated with said thermopile responsive to E. M. F. developed by it.

6. Gas testing apparatus for determining a combustible constituent in a gas comprising a conduit for gas to be tested, an electric heater associated with said conduit and provided with a pair of heating elements, an electric circuit including parallel and series connections between said elements, a thermostat associated with said conduit and connected electrically in said circuit for shifting from parallel to series connection when the heater has reached a predetermined temperature, a second thermostat in said conduit connected in said circuit and responsive to the temperature of gas passed through the conduit for opening and closing said series connection, a testing cell comprising a closed housing member and a tubular container mounted within and spaced from the walls of said housing member, foraminous partition means dividing said container into a central and two end compartments, said conduit being connected to said central compartment, the end compartments having outlets for gas passed therethrough from said central compartment, a thermopile disposed in said container with the junctions at one end disposed in one of said end compartments and with those at its other end disposed in the other of said end compartments, an outlet from said housing, and electrical means associated with said thermopile responsive to E. M. F. developed by it as a result of oxidation of an oxidizable constituent contained in the gas being tested.

7. An apparatus according to claim 6, said outlet having associated with it an aneroid valve for passing a substantially constant mass of said gas through the apparatus irrespective of changes in the ambient pressure of the gas.

8. Gas testing apparatus for determining a combustible constituent in a gas comprising a heater element through which gas to be tested is passed, a pair of electric heating elements associated with said heater, an electric circuit including parallel and series connections between said elements, a thermostat associated with said heater element and connected electrically in said circuit for shifting from parallel to series connection when the heater has reached a predetermined temperature, a second thermostat in said conduit connected in said circuit and responsive to the temperature of gas passed through the conduit for opening and closing said series connection, a testing cell comprising a closed housing member and a tubular container mounted within and spaced from the walls of said housing member, foraminous partition means dividing said container into a central and two end compartments, the end compartments having outlets for gas passed through from said central compartment, a thermopile disposed in said container with the junctions at one end disposed in one of said end compartments and with those at its other end disposed in the other of said end compartments, a conduit leading from said heater to said central compartment, an outlet from said housing, and electrical means associated with said thermopile responsive to E. M. F. developed by it as a result of oxidation of an oxidizable constituent contained in the gas being tested.

9. Gas testing apparatus for determining a combustible constituent in a gas comprising a heater through which gas to be tested is passed, an inlet to said heater, a pair of resistance elements associated with said heater, an electric circuit including parallel and series connections between said elements, a thermostat associated with said heater and connected electrically in said circuit for shifting from parallel to series connection when the heater has reached a predetermined temperature, a second thermostat in said conduit connected in said circuit and responsive to the temperature of gas passed through the heater for opening and closing said series connection, a testing cell comprising a closed housing member and a tubular container mounted within and spaced from the walls of said housing member, foraminous partition means dividing said container into a central and two end compartments, the end compartments having outlets for gas passed therethrough from said central compartments, a thermopile disposed in said container with the junctions at one end disposed in one of said end compartments and with those at its other end disposed in the other of said end compartments, a pair of passageways leading from said heater to opposed points of said central compartment, an outlet from said housing, electrical means associated with said thermopile responsive to E. M. F. developed by it as a result of oxidation of an oxidizable constituent contained in the gas being tested, and a canister associated with the inlet to said heater and provided with a body of adsorbent material through which all of the air to said conduit must pass.

10. A gas testing cell comprising a closed housing member and a tubular container mounted within and spaced from the walls of said housing member, foraminous partition means dividing said container into a central and two end compartments, the end compartments having outlets for gas passed therethrough from said central compartments, partition means extending between said container and housing to form separate closed chambers surrounding said compartments, a flow-controlling orifice in the housing wall of each of the end chambers, perforations in the wall of said container at said central section, a pair of conduits for gas to be tested opening into opposed areas of the central chamber, and a thermopile disposed in said container with the junctions at one end disposed in one of said end compartments and with those at its other end disposed in the other of said end compartments.

11. Gas testing apparatus for determining a combustible constituent in a gaseous atmosphere comprising in combination a casing member provided with a partition dividing it into lower and upper chambers, said lower and upper chambers being provided respectively with inlet and outlet openings, a series of heat conducting baffle members disposed in said lower chamber to provide a tortuous passageway open at its outer end to gas to be tested, an electric heater associated with said baffle members, a thermostat responsive to the temperature of gas heated by said baffles for controlling said electric heater, a testing cell disposed in said upper chamber and comprising a tubular container, a pair of foraminous partition members disposed in said container dividing it into a central and two end compartments, a thermopile disposed in said container with the junctions at one end disposed in one of said end compartments and those at the other end disposed in the other of said end compartments a conduit leading from the outlet of said tortuous passageway to said central compartment, and electrical means associated with said thermopile responsive to E. M. F. generated by it due to oxidation of a combustible constituent in the gas being tested.

12. Gas testing apparatus for determining a combustible constituent in a gaseous atmosphere comprising in combination a casing member provided with a partition dividing it into lower and upper chambers, said lower and upper chambers being provided respectively with inlet and outlet openings, a conduit closed at its lower end disposed in said lower chamber with its open upper end associated with an opening in said partition, a series of heat conducting baffle members disposed in said lower chamber to provide a tortuous passageway open at its outer end to gas from said inlet and at its inner end to said conduit, an electric heater associated with said baffle members, a thermostat disposed in said conduit responsive to the temperature of gas passed through it for controlling said heater, a testing cell disposed in said upper chamber and comprising a closed housing member and a tubular container mounted coaxially within and spaced from the walls of said housing member, a pair of foraminous partition members disposed in said container dividing it into a central and two end compartments, said end compartments being provided with gas outlets, a thermopile disposed in said container with the junctions at one end disposed in one of said end compartments and those at the other end disposed in the other of said end compartments partition members extending between the outer wall of said container and the inner wall of said housing member and forming a closed space around said central compartment and closed end spaces around said end compartments, an outlet provided with a flow-controlling member in each of said end spaces for discharging gas into the upper compartment, the wall of said central compartment being provided with perforations, a pair of conduits leading from said partition opening to opposite sides of said central space, electrical means associated with said thermopile responsive to E. M. F. generated by it due to oxidation of a combustible constituent in the gas being tested, and a canister containing moisture adsorbent connected to the inlet to said lower chamber for passage therethrough of all of the gas passed into the lower chamber.

13. Gas testing apparatus for determining a combustible constituent in a gaseous atmosphere comprising in combination a casing member provided with a partition dividing it into lower and upper chambers, said lower and upper chambers being provided respectively with inlet and outlet openings, a conduit closed at its lower end disposed in said lower chamber with its open upper end associated with an opening in said partition, a series of heat conducting baffle members disposed in said lower chamber to provide a tortuous passageway open at its outer end to gas from said inlet and at its inner end to said conduit, an electric heater comprising two heating elements associated with said baffle members, an electric circuit including parallel and series connections between said elements, a thermostat associated with said heater and connected electrically in said circuit for shifting from the parallel to the series connection, a second thermostat in said circuit and disposed in said conduit for opening and closing said series connection, a testing cell disposed in said upper chamber and comprising a closed housing member and a tubular container mounted coaxially within and spaced from the walls of said housing member, a pair of foraminous partition members disposed in said container dividing it into a central and two end compartments, said end compartment being provided with gas outlets, a body of oxidizing catalyst disposed in one of said end compartments, a thermopile disposed in said container with the junctions at one end disposed in one of said end compartments and those at the other end disposed in the other of said end compartments a heat exchanging element comprising thin heat conducting metal surfaces arranged in said upper chamber between said cell and the opening in said partition, a connection between said partition opening and one end of said heat exchanger, partition members extending between the outer wall of said container and the inner wall of said housing member and forming a closed central space surrounding said central compartment and closed end spaces surrounding said end compartments, an outlet provided with a flow-controlling member in each of said end spaces for discharging gas into the upper compartment, a pair of conduits leading from the other end of said heat exchanger to opposite sides of said central space, electrical means associated with said thermopile responsive to E. M. F. generated by it due to oxidation of a combustible constituent in the gas being tested, and a canister containing moisture adsorbent connected to the inlet to said lower chamber for passage therethrough of all of the gas passed into the lower chamber.

WILLIAM P. YANT.
HARRY N. COTABISH.

REFERENCES CITED

The following references are of record in the file of this patent:

UNITED STATES PATENTS

| Number | Name | Date |
|---|---|---|
| 1,321,063 | Lamb et al. | Nov. 4, 1919 |
| 1,416,361 | Lamb et al. | May 16, 1922 |
| 1,578,666 | Katz | Mar. 30, 1926 |
| 1,992,747 | Gilliland et al. | Feb. 26, 1935 |
| 2,083,521 | Miller | June 8, 1937 |
| 2,114,401 | Price | Apr. 19, 1938 |
| 2,160,326 | Carbonara | May 30, 1939 |